(12) United States Patent
Hochmuth et al.

(10) Patent No.: US 7,925,737 B2
(45) Date of Patent: Apr. 12, 2011

(54) SYSTEM AND METHOD FOR DYNAMIC CONFIGURATION OF NETWORK RESOURCES

(75) Inventors: Roland M. Hochmuth, Fort Collins, CO (US); Robert Paul Martin, Fort Collins, CO (US); Philip Michael Walker, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3013 days.

(21) Appl. No.: 09/953,713

(22) Filed: Sep. 17, 2001

(65) Prior Publication Data

US 2003/0055968 A1    Mar. 20, 2003

(51) Int. Cl.
*G06F 15/173* (2006.01)

(52) U.S. Cl. ......... 709/224; 709/227; 709/229; 370/354

(58) Field of Classification Search .................. 713/201; 709/250, 269, 218, 203, 266, 224, 227, 229; 707/204, 102; 370/354
See application file for complete search history.

(56) References Cited

U.S. PATENT DOCUMENTS

| | | | | |
|---|---|---|---|---|
| 6,038,227 | A * | 3/2000 | Farris et al. | 370/354 |
| 6,141,759 | A * | 10/2000 | Braddy | 713/201 |
| 6,237,008 | B1 * | 5/2001 | Beal et al. | 707/204 |
| 6,374,300 | B2 * | 4/2002 | Masters | 709/229 |
| 6,430,624 | B1 * | 8/2002 | Jamtgaard et al. | 709/246 |
| 6,453,361 | B1 * | 9/2002 | Morris | 709/250 |
| 6,470,389 | B1 * | 10/2002 | Chung et al. | 709/227 |
| 6,539,427 | B1 * | 3/2003 | Natarajan et al. | 709/224 |
| 6,564,261 | B1 * | 5/2003 | Gudjonsson et al. | 709/227 |
| 6,618,764 | B1 * | 9/2003 | Shteyn | 709/249 |
| 6,687,735 | B1 * | 2/2004 | Logston et al. | 709/203 |
| 6,701,352 | B1 * | 3/2004 | Gardner et al. | 709/218 |
| 6,718,332 | B1 * | 4/2004 | Sitaraman et al. | 707/102 |
| 6,898,188 | B1 * | 5/2005 | Hamami | 370/252 |

* cited by examiner

*Primary Examiner* — Tammy T Nguyen

(57) ABSTRACT

The present invention comprises a method for automatically configuring network resources. The method includes receiving a request from a client for at least one of a plurality of network resources in a network and automatically configuring the at least one of the plurality of network resources and the network in response to the request. The method also includes automatically associating in a client cell the at least one of the plurality of network resources with the client, wherein the client can access the at least one of the plurality of network resources that have been associated with the client in the client cell. In a particular embodiment, the client cell may be a virtual local area network.

7 Claims, 3 Drawing Sheets

SYSTEM AND METHOD FOR DYNAMIC CONFIGURATION OF NETWORK RESOURCES

RELATED PATENT APPLICATION

This application is related to co-pending U.S. patent application Ser. No. 09/954,352, entitled "System and Method for Providing Secure Access To Network Logical Storage Partitions" filed Sep. 17, 2001.

TECHNICAL FIELD OF THE INVENTION

The present invention relates in general to computer systems and, more specifically, to a system and method for dynamically configuring network resources in a network.

BACKGROUND OF THE INVENTION

Many of today's computing tasks, such as large enterprise projects, require powerful computer systems and software applications. The use of these software applications may require computer systems with large memory capacity and/or processor speeds, and may include, for example, applications for electronic and/or mechanical design and analysis. These applications may also be partitioned according to function, thereby requiring licenses to be purchased for a large number of applications to complete entire projects for the enterprise.

As enterprises grow, their configurations may become burdensome and difficult to maintain. For example, enterprise needs typically change dynamically with program needs, and one program or cost-center may require more resources than another during, for example, periods of peak processing. During these situations, load balancing of the computing resources may be necessary. Moreover, each cost-center or customer must handle accounting issues for each of their computing resources. For example, in many cases, the number of computing resources and/or licenses resident on those resources in use at any particular time may be monitored and/or allocated to a cost center, as well as its resource. Enterprise needs typically change throughout the lifetime of an enterprise, and as a result the enterprise should be prepared to accommodate the addition or subtraction of additional resources as needed.

Some enterprises may also employ application service providers (ASPs) to provide computer processing capability and applications on an as-needed basis. These enterprises may process their data on the ASP's computer system and software applications, and may then rely exclusively on the ASP to provide access to these applications or may use the ASP to supplement their own resources during busy periods. In addition, enterprises on an ASP network are typically concerned about data security and typically do not wish others to see, copy, or corrupt their data as it travels to or from, or is processed on, the network. In an ASP situation, some enterprises may even process their data on the same server concurrently as their competitors. Unfortunately, ASPs may protect enterprise data through comprehensive access control lists, but they do not typically provide physical isolation and encryption of client data.

In some cases, traditional computing systems have approached these problems by creating network cells and automatically transferring network resources to and from them as needed by using some form of manual configuration. Some applications, such as VLAN Pilot available from Hewlett Packard (HP), and VlanDirector available from Cisco Systems, Inc. (Cisco), may only configure network devices and create network cells. Unfortunately, this process is usually time consuming, error prone and may give rise to network problems. For example, a security breach or some network down time may occur as a computing resource is manually added or removed from a cell. In addition, monitoring and/or maintaining the required resources is very burdensome. For example, each project within an enterprise may require different network resources using different operating systems and/or applications. Tracking and/or installing these licenses and applications must be carefully performed in order to avoid errors.

SUMMARY OF THE INVENTION

From the foregoing, it may be appreciated that a need has arisen for a secure and automated workflow for brokering of network resources in a network. In accordance with the present invention, a method and system for dynamically configuring network resources are provided that substantially eliminate or reduce disadvantages and problems of conventional methods.

One aspect of the invention is a method for automatically configuring network resources. The method comprises receiving a request from a client for at least one of a plurality of network resources in a network and automatically configuring the at least one of the plurality of network resources and the network in response to the request. The method also includes automatically associating in a client cell the at least one of the plurality of network resources with the client, wherein the client can access the at least one of the plurality of network resources that have been associated with the client in the client cell.

Another aspect of the invention is a dynamic network resource configuration system. The system includes a plurality of network resources in a network that is connected to a client, and a broker connected to the network. The broker is operable to automatically cause configuration of at least one of the plurality of network resources and the network in response to a request from a client and to cause the at least one of the plurality of network resources to be changeably connected through the network so that the client can access the at least one of the plurality of network resources.

Yet another aspect of the invention is a dynamic configuration application. The application comprises a computer-readable medium and application software residing on the computer-readable medium. The application software is operable to cause configuration of at least one of a plurality of network resources in a network and configuration of the network in response to a request from a client in the network and to cause the at least one of the plurality of network resources to be changeably connected to a switch connected to the client.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE DRAWINGS

Figure 1:
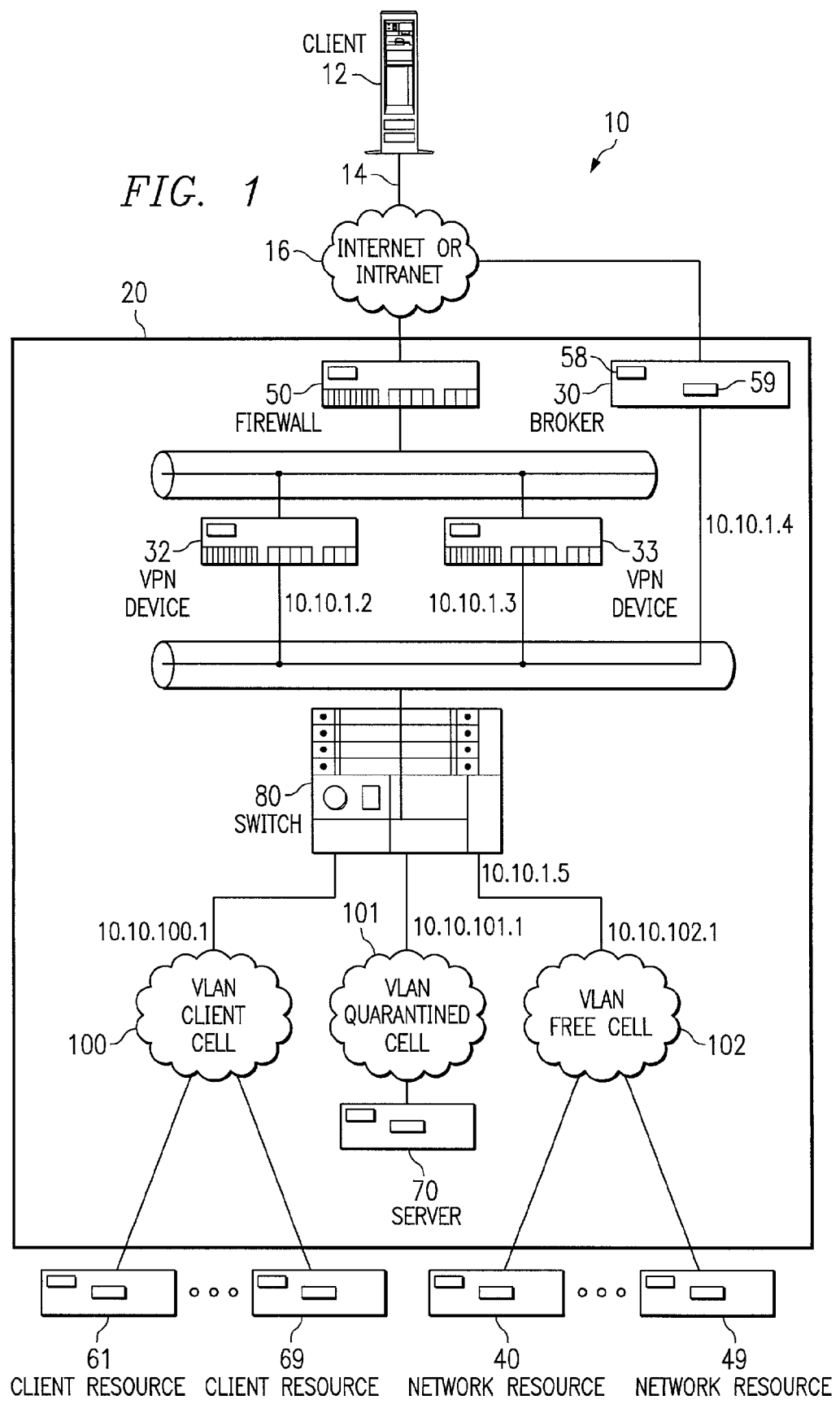
FIG. 1 is a block diagram of an example of a system with free network resources that may be dynamically configured according to an embodiment of the present invention.

FIG. 1 is a block diagram of an example of a system with free network resources that may be dynamically configured according to an embodiment of the present invention. Secure brokering system 10 includes a secure switched network 20 that may be used to provide access to various clients to network resources that provide functionality such as, but not limited to, data storage, data processing, or a combination thereof. For example, application service providers (ASPs) may use secure brokering system 10 to dynamically and securely change and configure access to selected ones of network resources 40, . . . , 49 as desired. Secure brokering system 10 establishes a secure environment for each client so that client data may be protected from undesirable and/or unauthorized access, viewing, copying, or modification. Secure brokering system 10 provides secure access to network resources for clients, reducing the cost of maintaining complex computer systems for the clients while ensuring that sufficient computer resources are available to a client as desired. Secure brokering system 10 is operable to automatically configure secure switched network 20 and applicable devices therein such as switches and routers as it changes and configures access to selected ones of network resources 40, . . . , 49.

The invention provides several important advantages. Various embodiments of the invention may have none, some, or all of these advantages. For example, application service providers (ASPs) may use the system to dynamically and securely change and configure access to selected ones of network resources as desired, so that client data may be protected from undesirable and/or unauthorized access, viewing, copying, or modification. Such an advantage may provide secure, access to network resources for clients, reducing the cost of maintaining complex computer systems for the clients while ensuring that sufficient computer resources are available as desired.

Another technical advantage of the invention is that the invention includes a variety of methods to connect clients to network resources, including a dedicated line and/or through a virtual private network to maximize security of that client's data while it is in transit. By automatically making available additional network resources to one or more clients, automatically configuring selected ones of these network resources and updating applicable databases, clients may acquire additional computational resources on an as-needed basis.

Yet another technical advantage of the invention is that the invention may reduce the need for manual system or network administration, and may be less errorprone than traditional systems. Reduction or removal of errors may also reduce the probability of network downtime and/or security holes in the network. Moreover, this automated system and method may be executed by software that may be implemented faster and/or with fewer resources than traditional manual systems, and provides for account configuration, network configuration, and system configuration to be combined into a single process.

It may be illustrative to discuss the usage of various terms. For example, network resources 40, . . . , 49 may be any type of electronic device that may be connected to a network and may include, but are not limited to, computer processors, network servers, appliances, workstations, storage devices, secure switch networks, appliances or any other device operable to be attached to a network.

A cell may be defined as any collection of network resources that is securely isolated from other network resources unless a connection is explicitly established between them. Cells and clients may be established as one-to-one, one-to-many, or many-to-one, or many-to-many relationships. That is, one or more cells 100 may be associated with one or more clients 12, depending on the application. A connection may be defined as a network path from one device to another and may be, for example, a virtual private network (VPN), virtual interface, routing path, or a combination thereof. A connection may be electronically, optically or otherwise established using a variety of known methods. Broker 30 is operable to control a connection to requested ones of network resource clients 40, . . . , 49 to a cell designated for a particular client 12.

Cells may be implemented using a variety of methods. For example, one method for implementing a cell is disclosed in U.S. patent application Ser. No. 09/678,933 for a HIGHLY SECURE COMPUTER SYSTEM ARCHITECTURE FOR A HETEROGENEOUS CLIENT ENVIRONMENT of Robert P. Martin et al. As another example, in a particular embodiment cells may be implemented as virtual local area networks (VLANS) including, but not limited to, port-based VLAN's, media access controller (MAC) addressed-based VLAN's, tag-based VLAN's and other methods. For illustrative purposes and not by limitation, aspects of the present invention are described using cells implemented using port-based VLANs. VLAN's are typically preferably configured to a delimited range of attributes such as IP addresses or ports, and thus may send or receive packets only to those attributes such as IP addresses or ports in each of their delimited ranges. Without routing enabled, a VLAN may not send or receive packets to other VLAN's. Thus, in a particular embodiment, VLAN cells may be securely isolated from one another by not enabling routing.

FIG. 1 illustrates a secure brokering system 10 that includes one or more clients 12 coupled to a secure switched network 20 through a network such as the Internet 16. Secure switched network 20 includes a broker 30, a switch 80, and cells 100, 101 and 102. Secure switched network 20 may contain virtual private networks (VPNs) that are connected to one or more VLANs. For example, in the embodiment illustrated in FIG. 1, secure switched network 20 preferably includes a firewall 50 and one or more VPN termination devices 32 and 33. Networks such as the network domains, cells, and VLANs discussed herein are preferably connections, or network paths, between computer systems and resources whereas network devices, such as VPN termination devices 32 and 33, and VLAN switch 80, are preferably devices that establish and support networks. Networks are operable to control in which cells network resources reside and how they are connected. Network devices are physical, whereas networks are logical.

Various clients 12 may be connected to secure brokering system 10 by any suitable data transmission means. For example, as illustrated in FIG. 1, client 12 may be connected to secure brokering system 10 by a broadband connection 14 across the Internet 16. Other clients may be connected to secure brokering system 10 by a dial-up connection across Internet 16, by dedicated line (neither of which is explicitly shown) or by other methods. The term "client" may be used to refer to any computer system requiring access to network resources and may be, but are not limited to, independent computer systems, highly secure computer systems, workstations, servers, mobile computing devices, appliances, and networks having some or all of the foregoing. A client may include one or more computer resources and utilize any software system implemented using a distributed component model or service model such as, but not limited to, e-Speak, a software infrastructure available from Hewlett-Packard, Enterprise JavaBeans, a component model for networked and distributed systems available from Sun Microsystems, or CORBA for communicating or interfacing with a remote resource broker.

A client also conforms to an interface provided by a broker, and may request network resources as desired using the broker. A client may communicate with broker 30 in, for example, a client-server implementation, using a variety of methods including, but not limited to, application program interfaces (APIs), graphical user interfaces (GUIs), remote method invocation (RMI), distributed network interfaces, HTML, and XML. In a particular embodiment, client 12 may interface with any load sharing facility (LSF) application, which allows evaluation of the number of network resources that may be required within a cell to complete all pending jobs within a predetermined time frame. In another embodiment, client 12 may include a graphical user interface (GUI) from which users may request network resources. In a particular embodiment, these requests may be serviced by secure brokering system 10 to balance loads for one or more clients 12. Alternatively, or in addition, several secure brokering systems 10 may be linked together to balance such processing loads.

In this exemplary conceptual diagram of secure brokering system 10, client 12 is connected to Internet 16 through a VPN termination device/firewall 50 across broadband connection 14. One example of a VPN termination device/firewall 50 may be a router with a firewall such as a PIX firewall manufactured by Cisco Systems, Inc. These routers may be described as "VPN-capable." Data from client 12 may first pass through firewall 50, which performs standard functions of a firewall at the perimeter of a secure site, rejecting unauthorized network traffic by filtering out or passing data according to a set of filtering rules configured by a system administrator.

In a particular embodiment, secure switched network 20 may be implemented with an administrative VLAN and a management LAN. For example, an administrative VLAN may use one or more devices such as VPN termination devices 32 and 33, and may be used to limit network traffic to limited network or broadcast domains to improve performance and to securely isolate data traffic of one or more clients 12 as desired. Each connection within VPN termination device 32 and 33 may be associated with specific VLANs to establish secure connections within secure switched network 20. VPN connections may be associated with VLANs as desired as one-to-one many, or many-to-one relationships. In the embodiment illustrated in FIG. 1, an administrative VLAN includes VPN termination devices 32 and 33 and firewall 50, which associate address information on IP packets with physical network ports on VLAN switch 80. This configuration enables VLAN switch 80 to restrict IP packets to a correct network port on the switch if the IP packets are directed to an established VLAN such as VLAN 100, or to discard IP packets otherwise.

In a particular embodiment, a management VLAN may be used to configure and monitor network devices and may be implemented using one or more devices 80 such as network switches. One example of a switch 80 includes the 6509 network switch with MSFC available from Cisco. These switches may be described as "VLAN-capable". In the embodiment illustrated in FIG. 1, management VLAN includes VPN termination devices 32 and 33, switch 80, and broker 30. These elements are illustrated in FIG. 1 with exemplary VLAN addresses of 10.10.1.2, 10.10.1.3, 10.10.1.5, and 10.10.1.4, respectively.

VPN termination devices 32 and/or 33 may satisfy a variety of security and/or performance needs. For example, VPN termination devices 32 and 33 may establish a virtual private network for each client 12 and may be particularly useful for Internet connections to provide a secure connection during transmission of data and/or encrypting of outgoing data and filtering and decryption of incoming data. VPN functions may be included in VPN-capable routers or in any other Layer 3 network devices. Examples of VPN termination devices include routers such as the 5001 router available from Cisco. VPN termination devices 32 and/or 33 may also perform an authentication function to verify the identity of one or more clients before any client connections are established to any new network resources. As one example, VPN termination devices 32 and/or 33 may access an authentication function via a hard-wired local area network (LAN) connection, may decrypt encrypted data from one or more clients 12 based on this authentication information, and/or may verify that the IP packets sent from a client through the VPN are authorized to access the destination IP address or VLAN on secure brokering system 10 is valid for that specific client 12. In addition, VPN termination devices 32 and 33 may comprise either hardware or software termination devices, and may use different encryption keys for various clients 12, depending on the application.

Generally, broker 30 negotiates and manages the process of acquiring and configuring network resources requested by a client, and ensuring that the client has access to the requested network resource. More specifically, broker 30 dynamically causes the configuration of secure switched network 20 to securely connect selected ones of network resources 40, . . . 49 as desired to clients 12 that may be logically connected to, or associated with, a cell 100, while isolating the resources of each client 12 in secure brokering system 10 from one another. One method for brokering network resources is discussed in conjunction with FIG. 2.

Broker 30 may include a database 58 and/or one or more processing modules and preferably includes computer readable program code or logic 59 for automatically causing the configuration of secure switched network 16. That is, broker 30 may, depending on the implementation, configure secure switched network 16, invoke other processes to perform the configuration, or a combination of both. The code may reside in one or more modules in broker 30 and/or in other subsystems. This code may be executed on a computer or other processor, may receive requests for one or more network resources 40, . . . 49 from client 12 and automatically allocate one or more network resources 40, . . . 49 as desired according to a variety of factors, including load balancing, priority, security, and resource availability. For example, broker 30 may be a software system implemented using a distributed component or service model such as, but not limited to, e-Speak, Enterprise JavaBeans, or CORBA. Broker 30 may advertise the services it provides using software mechanisms such as an e-Speak advertising service, CORBA, or LDAP server, and provide a network interface for client 12 to invoke over Internet 20 to request, remove, and/or modify network resources as desired. This allows, for example, a variety of software services to search for any software services advertised by broker 30 and connect to those software services advertised by broker 30 that match a given criteria. Broker 30 may also invoke interfaces in sub-systems that have the ability to configure network cells and connections, configure network resources, and/or invoke applications such as Ignite/

UX that may be used to configure network resources. These interfaces may be programming language interfaces such as a JAVA interface or XML Schema. One method for performing such dynamic configuration is discussed in conjunction with FIG. 2.

Any number of client network resources in secure brokering system 10 may be connected to client 12 through secure switched network 20. In this embodiment, nine client network resources 61, ..., 69 are illustrated. FIG. 1 illustrates the concept that the network domain for client 12 is extended around network resources 61, ..., 69 in cell 100. In other words, client 12 and network resources 61, ... 69 may access one another. Network domains for other clients may be extended around other network resources. These network domains may then be isolated from one another inside cells within secure brokering system 10.

Client VLANs 100, 101, and 102 are secure and isolated networks in secure brokering system 10. Switch 80 associates address information on IP packets with physical network ports on switch 80. This enables switch 80 to direct IP packets to the correct network port on the switch if the IP packets are directed to an established cell such as VLAN 100 or VLAN 101, or to discard IP packets otherwise. VLAN 100 connects network resources 60, ..., 69 to client 12 through secure switched network 20, which may be implemented using a variety of configurations, and may include several isolated VPN connections established by VPN termination devices 32 and 33. A quarantine cell, VLAN 101 is an optional cell and can connect selected network resources 40, ..., 49 to broker 30 so that they may be configured by a server such as ignite server 70 after being requested by client 12. Ignite server 70 may be a system that may automatically install an operating system on a network device by performing tasks such as, but not limited to, assigning an IP address. VLAN 101 is isolated from other cells, and is configured to allow select network access that is controlled by broker 30. For example, broker 30 may be configured to communicate with network resources within VLAN 101 either directly using one of many secure protocols, via techniques such as a serial port connection or a terminal server. Broker 30 could also provide access to these network resources by using a secure network communications methods such as a secure network protocol in combination with additional security mechanisms to cause communications with the network resources or by other known methods. VLAN 101 may be omitted in particular embodiments, as discussed in further detail in conjunction with FIG. 2. VLAN 102 represents a free pool of network resources 40, ..., 49 from which client 12 requests may be satisfied. VLANS 101 and 102, and the network resources associated with them, may be configured in the embodiment illustrated in FIG. 1 to receive no traffic to or from client 12.

Although client 12 is connected to secure brokering system 10 through the Internet 16, client 12 may be connected by a variety of methods including a dedicated line and/or through a virtual private network to maximize security of that client's data in transit. In other embodiments, secure switched network 20 may include additional clients 12 for which operations may also run similarly seamlessly. For example, secure switched network 20 may also include a variety of other clients (not explicitly shown) that may either share or not share data through secure switched network 20 as desired. These clients may be connected through the same or additional VPN termination devices 32 and/or 33 and/or switches 80 to network resources that may be similarly configured as desired. That is, secure switched network 20 may also include multiple VPNs and VLANs as desired to provide support for one or many enterprise entities and/or clients. Additional physical connections through devices such as VPN termination devices 32 and/or 33 may also be used to, for example, provide redundancy and/or a given level of overall network throughput. By automatically making available additional network resources 40, ..., 49 to one or more clients 12, automatically configuring selected ones of these network resources 40, ..., 49, automatically configuring the network including network switches, and updating applicable databases 58, clients 12 may operate seamlessly as desired.

Figure 2:
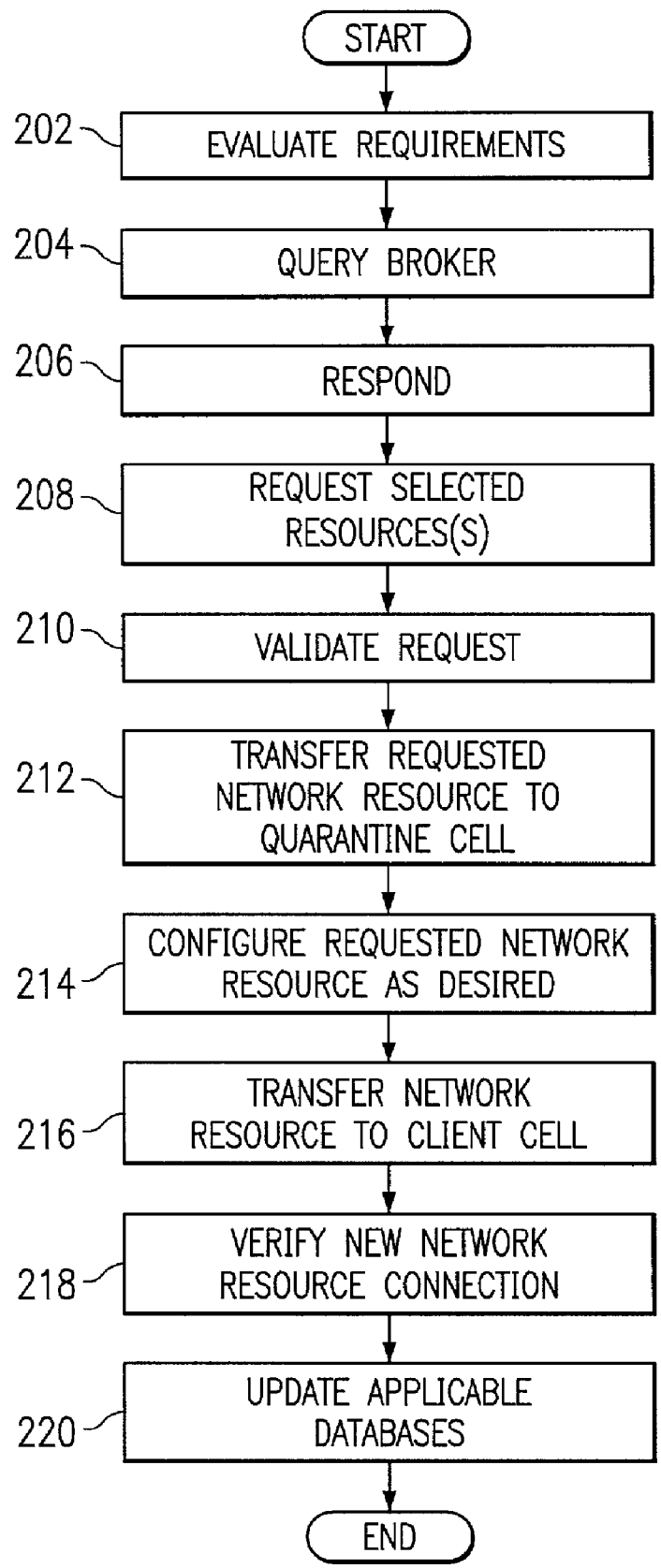
FIG. 2 illustrates a method for dynamically configuring network resources according to an embodiment of the present invention.

FIG. 2 illustrates a method for dynamically configuring network resources. Generally, the method assumes the availability of a pool of free network resources 40, ..., 49 and that each of these nodes may be configured with any applicable operating system images, applications, and/or licenses. In some applications, the method may include establishing an account and one or more cells for client 12 with broker 30 as a precondition. The method may also include establishing a VPN from client 12 to the cell as another precondition. Various embodiments may utilize fewer or more steps, and the method may be performed using a number of different implementations and different orders of workflow, depending on the application. Some of the steps may be performed in parallel. For example, a request for one or more of network resources 40, ..., 49 may be provided in one of many forms, such as phone or email or other electronic format. The request may follow one of many well-defined processes for requesting and negotiating services using XML document exchanges, such as specified in the e-Speak Service Framework Specification (v. 2.0, dated Feb. 9, 2001), developed by HP.

Although the invention contemplates numerous methods for implementing the method as is discussed below, an example may be illustrative before discussing the steps referred to in FIG. 2. For example, in a particular embodiment, broker 30 may utilize a software architecture for logic 59 that may be logically composed of several classes and interfaces. These classes may operate in a distributed environment and communicate with each other using distributed communications methods, and may include a distributed component architecture such as Common Object Request Broker Architecture (CORBA), Java™ Remote Method Invocation (RMI), and Enterprise Java Beans.

As another example, a method for providing dynamic configuration of network resources may in a particular embodiment generally utilize the following workflow with a software architecture that utilizes a Class Client to invoke operations to request and/or free network resources using broker 30. A Class Client may be instantiated on client 12. In this example, an instance of Class Client may determine that it needs another network resource added to its cell, and may request a network resource using a Class ResourceBrokerInterface, which may be instantiated by broker 30. Additional classes and operators may also be implemented as desired. As one example, additional classes may be labeled ResourceBrokerImplementation, ResourceBrokerInterface, NetworkResourceService, NetworkService and ResourceService, and may be used during the method in a particular embodiment as discussed below.

An instance of a Class ResourceBrokerImplementation may be used to determine the availability of network resources in free cell 102 that best match the criteria specified by client 12 and may return the results to client 12. Class ResourceBrokerImplementation may be used to implement a variety of interfaces and may be associated with Classes NetworkService and ResourceService to create and/or delete cells and assign and/or remove network resources from within those cells. The instance of Class Client may then identify the network resources that it desires from a list returned by Class ResourceBrokerImplementation and may invoke Class GetNetworkResource using method ResourceBrokerInterface. As one example, an invocation of GetNetworkResource may be sent to an instance of ResourceBrokerImplementation, which implements an operation GetNetworkResource. Class ResourceBrokerImplementation may then determine and reserve the requested network resource in free cell 101 and may invoke operations in Classes NetworkService and ResourceService to configure cell 100 for the network resource and configure the network resource for cell 100. An operator ConfigureCellforResource may then invoke operators in a Class VLANSwitchService to assign a port into which the network resource is plugged to quarantine cell 102. Class VLANSwitchService may be one of a variety of switch services that have the capability of creating secure cells and adding and removing resources to the cells. For example, Class VLANSwitchService may be used to provide an interface and implementation thereof to create and/or remove VLANS and assign ports to VLANS. In a particular embodiment, this service may communicate with network switches to configure than using one of a variety of communications methods such as, but not limited to, simple network management protocol (SNMP) over a network or a command line interface using, for example, Telnet over a console port.

A NetworkResourceService Class may provide an implementation of an interface to assign an IP address, IP mask, and/or IP gateway to the network resource selected by the client. This service may communicate with network resources to configure them using a variety of communications methods such as, but not limited to, simple network management protocol (SNMP) over a network or a command line interface using, for example, Telnet over a console port.

The network resource selected by the client may be moved between cells, such as between quarantine cell 101 to client cell 100 by Class ResourceBrokerImplementation, which invokes operators for the appropriate services and parameters available to identify and specify the cell and network resource.

Class ResourceBrokerImplementation may also use a variety of methods to verify that secure switched network 40 and/or the network resource selected by the client have been correctly configured. Class ResourceBrokerImplementation may also update any applicable databases and/or respond to, and/or in form, client 12 that the network resource selected by the client is available for access by the client, along with any other optional information. Client 12 may then attach to that network resource selected by the client using its VPN connection.

Referring now to FIG. 2, the method begins in step 202, where client 12 evaluates and prepares its network resource requirements. For example, a client may require one or more network resources with specific features such as, but not limited to, system architecture, memory capacity, and/or processor clock speed. Client 12 may also desire one or more network resources when a parameter such as price per network resource reaches an acceptable level. In step 204, client 12 may query broker 30 for one or more of network resources 40, . . . , 49 that most closely match its criteria. This step may be performed using a variety of methods, including invoking an interface such as a JAVA interface resident or running on broker 30, or by sending an XML document to broker 30. In step 206, broker 30 sends a response to client 12 that includes those network resources 40, . . . 49 that match the request. This response may also include a product description and/or billing information such as, but not limited to, a cost per network resource. In step 208, client 12 requests broker 30 configuration of selected one or more of the network resources 40 . . . 49. Client 12 may also send a request to broker 30 with details as to how selected network resources 40, . . . 49 are to be configured. By way of illustration and not by limitation, these configuration details may include desired operating systems and patches, applications, system parameters, and/or licenses. In step 210, broker 30 may send a response to client 12 that validates the request. For example, broker 30 may not validate a response where the request cannot be handled, and may subsequently reject such a response. As another example, broker 30 may not validate a response where a client may not have authorization for broker 30 to validate the request.

In step 212, broker 30 optionally transfers the requested one or more network resources 40, . . . , 49 to quarantine cell or VLAN 101. For illustrative purposes, a single requested network resource 42 will be discussed in conjunction with the remaining description for FIGS. 2 and 3. The topology of secure switched network 20 may then be modified by broker 30 or other subsystems by configuring devices in secure switched network 20 so that the selected network resource is recognized as being transferred to quarantine cell 101. In other words, broker 30 may configure secure switched network 20 and applicable devices therein so that secure switched network 20 In other words, broker 30 may configure secure switched network 20 and applicable devices therein so that secure switched network 20 recognizes that the selected network resource is recognized in a new configuration, whether in client cell 100, quarantine cell 101, or free cell 102. For example, broker 30 may connect to the device that needs to be reconfigured (here, switch 80) and sends a required stream of commands to reconfigure the device. For example, attributes of selected network resource 42 such as its IP address, gateway and/or network mask may be assigned to quarantine cell 101 so that network resource 42 is visible within that cell. Step 212 may also be omitted as desired, and network resource 42 may be transferred directly to client cell 100. In such an embodiment, network resource 42 may be configured within step 210, step 214, or a combination thereof. As one example, step 212 may be included or omitted depending on a desired level of security for system 10, client 12, server 70, or a combination of the above.

In step 214, network resource 42 may be configured as desired. Many operations may be performed to configure network resource 42, such as igniting network resource 42 with an operating system image according to the needs of client 12, and depend on the application and the particular needs of client 12. In a particular embodiment, an ignite server 70 such as an HPJ6000 configured as an ignite server and available from Hewlett-Packard may be used to ignite, or configure, network resource 42. Broker 30 initiates the process for configuring network resource 42. Network resource 42 may be configured using various methods. For example, a new operating system such as UNIX may be installed as desired on network resource 42. Alternatively or in addition, network resource 42 may receive modifications to kernel parameters such as an amount of paging space, new installations of applications such as web servers, domain name servers (DNSs), Lightweight Directory Access Protocol (LDAP) servers, end user applications and license servers, and setups for user accounts. Also alternatively or in addition, network resource 42 may receive additional security measures, be security hardened and/or may receive installations of system monitoring agents such as network node management agents. Network resource 42 may also receive application-specific customizations as desired.

In step 216, network resource 42 may be transferred to client cell 100. Similar reconfiguration of the topology of secure switched network 20 may be performed as was discussed in conjunction with step 212. For example, operations may be invoked to move the physical port into which network resource 42 is plugged from quarantine cell 101 to client cell 100, and configure the IP addresses, IP mask, and/or IP gateway so that network resource 42 is visible in client cell 100. This reconfiguration may also involve steps such as, but not limited to, configuring network devices to move a port on which network resource 42 is connected from one cell to another, configuring a router's access control list (ACL) and/or other parameters to permit or deny access to network resource 42 through any network connection, and/or configuring a firewall. As one example, where a cell is a port-based VLAN, the identified port or ports in switch 80 into which network resource 42 is connected are modified to identify network resource 42 as being transferred to the requesting client cell, in this case VLAN 100. Network resource 42 may also require specific reconfiguration for attributes such as an IP address, network mask and/or gateway that may need to be reassigned. One example for such reconfiguration will be discussed in detail in conjunction with FIG. 3. Broker 30 may also utilize account security information to securely configure and transfer network resource 42 as desired. Account security information may be included in a request from client 12, an ACL residing in switch 80, or in other formats residing in other subsystems in system 10, and may include ASP-specified parameters. For example, in a particular embodiment, each client 12 may preferably be assigned its own client cell 100. Thus, broker 30 may only assign network resource 42 to a client cell 100 assigned to a client 12.

An example may be illustrative. Requested network resource 42 may have a designated port and IP address before the transfer process of 2/10 and 10.10.102.2, respectively. After the transfer to cell or VLAN 101, port 2/10 of selected network resource 42 may be modified in switch 80 so that network resource 42 is recognized as being in cell or VLAN 101. In addition, the IP address of network resource 42 may be modified to 10.10.101.2. Finally, the IP address for network resource 42 may be modified to 10.10.100.2 and port 2/10 may be modified in switch 80 so that network resource 42 is now recognized as being in cell or VLAN 100. Network resource 42 is thus connected to cell or VLAN 100 through these exemplary modifications to switch 80.

In step 218, the connection between client 12 and network resource 42 may then be verified using a variety of methods. For example, broker 30 may notify client 12, switch 80, or other subsystems that the request from client 12 for network resource 42 has been satisfied. Broker 30 may also include access parameters required for network resource 42 in the verification. In step 220, applicable databases 58 may be updated. These include, but are not limited to, databases that include status and accounting information that records the state of resources, transactions that have taken place, and customer accounts that shows all network resources that are currently assigned to a customer, cost center, department or other entity. Automatic updating and maintenance of these databases may facilitate proper allocation of resources and/or billing for licenses, devices, and network resources. These databases may be standalone databases or reside in one or more of clients 12, broker 30, switch 80, other subsystems in secure switched network 20, or reside externally to secure switched network 20.

Configuration of network resources may include an exemplary sequence of configuration commands. These commands may be instituted by a simple single function command to associate selected network resources 40, . . . , 49 with a particular client request. The sequence may be generated by code resident on broker 30. In a particular embodiment of the invention, these configuration commands configure VLANs 100, 101 and 102 to connect network ports so that information may be transmitted between the ports recognized by switch 80. As examples, these ports may be physical ports located on the chassis of switch 80 or virtual ports that may be defined in switch 80 by ranges of address information on incoming IP packets. This information provides a mapping to unique virtual ports on switch 80.

Figure 3:
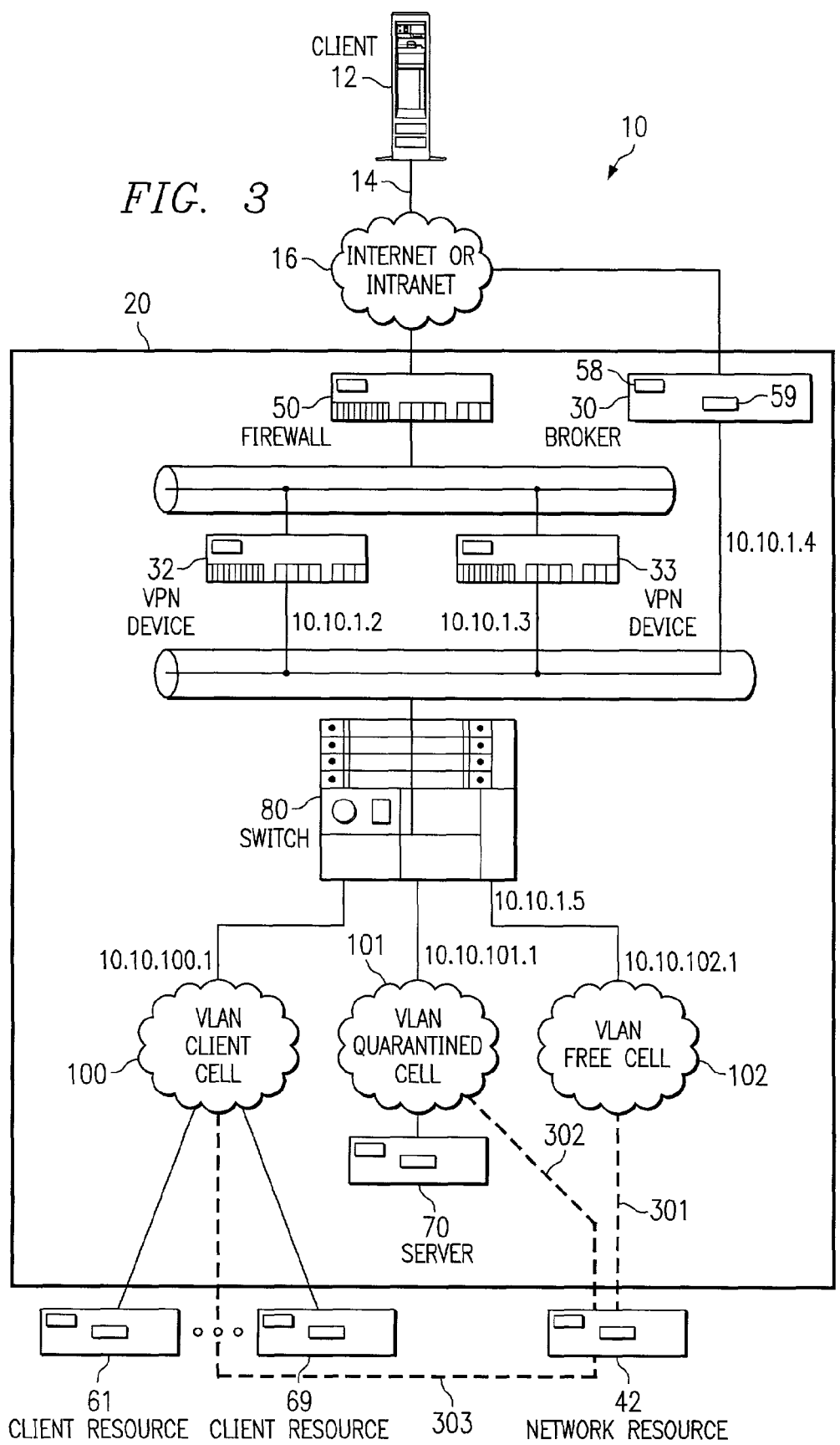
FIG. 3 graphically illustrates an example of the dynamic configuration of a network resource according to an embodiment of the present invention.

FIG. 3 graphically illustrates an example of the dynamic configuration of a network resource. FIG. 3 illustrates the transfer of network resource 42 from port-based cell VLAN 102 to port-based cell VLAN 100 in two separate steps, which are illustrated by connections 301-303. For example, network resource 42 is first transferred from port-based cell VLAN 102 to VLAN 101, a quarantine cell, where it may be configured by server 70. Network resource 42 is then transferred to a client cell, VLAN 100, for access by client 12.

FIG. 3 illustrates network resource 42 as a member of VLAN 102 via connection 301. The sequence to achieve client 12 connectivity to network resource 42 as illustrated in FIG. 3 may first include the step of transferring network resource 42 from VLAN 102 to VLAN 101, which may include first removing a port 2/10 from VLAN 102, adding port 2/10 to VLAN 101 to establish a connection 302, and removing connection 301. Once this configuration is complete, network resource 42 may be configured as discussed above in conjunction with FIG. 2. After configuration is complete, a sequence to transfer selected network resource 42 to VLAN 100 from VLAN 101 may include the steps of removing port 2/10 from VLAN 101, adding port 2/10 to VLAN 100 to establish a connection 303, and removing connection 302. Once this reconfiguration is complete, client 12 will have access to network resources 60, . . . , 69 as well as selected network resource 42 through secure switched network 20. In a preferred embodiment, client 12 does not have visibility into activities of network resources through VLAN 101 and/or VLAN 102. Only those devices connected through VLAN 100 may communicate with client 12.

Associations between clients 12 and various devices may be maintained by using ACLs in one or more devices within secure brokering system 10. One way to maintain these associations is by using mapping tables. Although this data is illustrated and discussed by using separate tables for clarity, this data may be stored in a variety of ways, including tables and files, and may be combined as desired. For example, mapping between clients 12 and IP addresses of various devices may be maintained in a VLAN to virtual private network (VPN) address map in broker 30 as illustrated in Table I and downloaded to VPN termination devices 32 and/or 33 when the mapping changes. This mapping provides for secure isolation of data traffic through switch 80.

For example, VLAN-capable switch 80 may uniquely associate ranges of address information such as incoming IP addresses with a particular cell or VLAN. This association may also be based on address information placed in the headers of the IP packets by VPN termination devices 32 and/or 33. Multiple VLANs 100, 101, and 102 may be processed by a single VLAN switch 80, as shown in FIG. 1, and the data that associates incoming IP addresses with a particular VLAN may be kept in a map similar to that shown on Table I. In addition, that VLAN may be uniquely associated with a list of physical ports or IP addresses that may each be connected to a network resource.

These and other maps may be kept as one or more maps in broker 30 and/or may be downloaded over a secure link to switch 80 whenever associations are changed. These maps may be updated by a common piece of software that ensures that the tables are synchronized to eliminate any connection between other clients and computer resources that are not meant to be connected. For example, each time any of these maps changes, the common software may verify that each connection in secure brokering system 10 to maintain the integrity of these connections. Alternatively, the common software may reconfigure the entire secure switched network 20 each time any of these maps change. However, such a reconfiguration may cause disruptions to network traffic for those clients whose mapping was not changed.

Exemplary contents for these maps are displayed in Tables I, II, and III with the IP addresses shown in FIG. 1. Although this is one exemplary method for organizing the information, many others are possible. Table I illustrates an example of a VLAN to VPN address map, which specifies mapping of IP addresses of elements in a client VLAN as discussed in FIG. 1 to those of a VPN in secure brokering system 10. Although the IP addresses for the VPNs are not shown in FIG. 1, Table I illustrates "outside addresses" for those elements within the management VLAN that are assigned to the same VPN and to the same client 12. It is possible that a given VLAN may not be mapped to any client 12 or any VPN at a given time. While an IP address is used in this example to uniquely identify a VPN for client system or systems, other techniques such as unique client identification numbers may serve the same purpose.

TABLE I

VLAN to VPN Mapping

| VLAN RESOURCE IP ADDRESS | VPN IP ADDRESS |
| --- | --- |
| 10.10.100.0/24 | 156.152.239.221 |
| 10.10.103.0/24 | 156.152.239.220 |
| 10.10.104.0/24 | 156.152.239.207 |

Table II illustrates an example of a network resource transfer to cell map. This map may, alternatively or in addition, specify the mapping of a VLAN to physical ports on VLAN switch 80. These ports may be specified as a blade number and port on that blade, for example. Where VLAN switch 80 supports two blades with ten physical ports each, network resources 42 may be connected to physical port 2/10, as discussed above.

TABLE II

Mapping of Network resource Transfers to Cells

| Transfer Stage | VLAN |
| --- | --- |
| Free | 102 |
| Quarantined | 101 |
| Transferred to Client | 100 |

Table III illustrates an example of a VLAN to cell map, which specifies the mapping of a VLAN to a range of IP addresses on VLAN switch 80. Ones of these addresses are illustrated in FIGS. 1 and 3. For example, FIGS. 1 and 3 illustrate exemplary addresses for VLAN 100 as 10.10.100.1, VLAN 101 as 10.10.101.1, and VLAN 102 as 10.10.102.1.

TABLE III

VLAN to Cell Mapping

| NODE OR SERVER IP ADDRESS | VLAN |
| --- | --- |
| 10.10.100.0/24 | 100 |
| 10.10.101.0/24 | 101 |
| 10.10.102.0/24 | 102 |

Although FIGS. 1 and 3 illustrate only those connections configured by broker 30, other physical connections in secure brokering system 10 are not shown, but will be easily understood by those skilled in the art. Because logical connections may only be established where physical connections exist, each free cell 102 and client cell 100 preferably includes a physical connection to each network resource 40, . . . 49 and 60, . . . 69, respectively. Various other network topologies may be used to establish these physical connections without departing from the inventive concepts disclosed herein.

What is claimed is:

1. A method for dynamically configuring network resources, comprising:
   receiving a request from a client for at least one of a plurality of network resources in a network;
   automatically configuring the at least one of the plurality of network resources and the network in response to the request; and automatically associating in a client cell the at least one of the plurality of network resources with the client, wherein the client can access the at least one of the plurality of network resources that have been associated with the client in the client cell.

2. The method of claim 1, wherein the client cell comprises a virtual local area network.

3. The method of claim 1, further comprising transferring and securely configuring the at least one of the plurality of network resources to a quarantine cell before associating in the client cell the at least one of the plurality of network resources with the client.

4. The method of claim 1, further comprising:
   receiving a query from the client over the network regarding parameters of at least one of the plurality of network resources; responding to the query; and
   validating the request from the client for the at least one of the plurality of network resources.

5. The method of claim 1, further comprising using a network connection through one or more virtual private networks by a plurality of clients to access the client cell, and wherein the client cell comprises a virtual local area network connected to the one or more virtual private networks.

6. The method of claim 1, further comprising updating at least one applicable database with status information associated with the at least one of the plurality of network resources.

7. The method of claim 1, further comprising updating at least one applicable database with accounting information.

* * * * *